(12) United States Patent
Wu et al.

(10) Patent No.: US 7,428,738 B2
(45) Date of Patent: Sep. 23, 2008

(54) GEAR TRANSMISSION SYSTEM FOR AN OPTICAL DISK DRIVE

(75) Inventors: Chao-Ching Wu, Hsinchu (TW); Yi-Cheng Tsao, Hsinchu (TW); Chun-Lung Ho, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 689 days.

(21) Appl. No.: 11/028,546

(22) Filed: Jan. 5, 2005

(65) Prior Publication Data
US 2005/0155046 A1 Jul. 14, 2005

(30) Foreign Application Priority Data
Jan. 8, 2004 (TW) .............................. 93100448 A (51) Int. Cl.
G11B 17/04 (2006.01)
G11B 33/02 (2006.01)

(52) U.S. Cl. .................................................... 720/607
(58) Field of Classification Search .................. 720/607
See application file for complete search history.

(56) References Cited

U.S. PATENT DOCUMENTS

| 5,959,956 A * | 9/1999 | Takishima .................. 720/607 |
| 5,995,468 A * | 11/1999 | Furukawa .................... 720/607 |
| 6,414,929 B1 * | 7/2002 | Fujiwara ..................... 720/607 |
| 7,100,175 B2 * | 8/2006 | Nishidate .................... 720/605 |
| 7,117,508 B2 * | 10/2006 | Burkart et al. .............. 720/607 |
| 7,222,350 B2 * | 5/2007 | Ho et al. ..................... 720/607 |
| 2004/0098734 A1 * | 5/2004 | Chen .......................... 720/607 |
| 2005/0114872 A1 * | 5/2005 | Liu ............................. 720/607 |

\* cited by examiner

Primary Examiner—Brian E Miller
(74) Attorney, Agent, or Firm—Troxell Law Office, PLLC (57) ABSTRACT

A disk drive includes a gear transmission system disposed within a casing. The gear transmission system includes first and second gears, a driven plate having a first serrated portion meshed with the first gear, a second serrated portion facing a third gear, and first and second guiding slots. A lifting frame has two couplers slidably engaging with the slots in the driven plate. Rotation of the third gear alternately in opposite directions results in movement of the driven plate in right and left sides of the casing, which, in turn, results in lifting of the frame to an upper reading position, in which, a resilient pushing arm of the lifting frame abuts against the driven plate to provide resilience between the second serrated portion and the third gear.

10 Claims, 13 Drawing Sheets

GEAR TRANSMISSION SYSTEM FOR AN OPTICAL DISK DRIVE

FIELD OF THE INVENTION

The present invention relates to an optical disk drive, more particularly to a gear transmission system for the optical disk drive to overcome jamming between a gear and a driven plate in the gear transmission system of the optical disk drive such that the disk tray will not be disposed midway due to jamming during the extending and retracting operations of the disk tray with respect to a casing.

BACKGROUND OF THE INVENTION

Among all the data storage solutions, the optical disks are becoming more and more important for backing up data and exchanging information because the optical disks have many advantages including a high storage capacity, easy to handle and carry, and a long preserving time for the stored data. Till now, the optical disk drives can be found all around us, such as in desktop computers, laptop computers, DVD players, and even some instruments or electronic products with built-in microprocessors.

Figure 1:
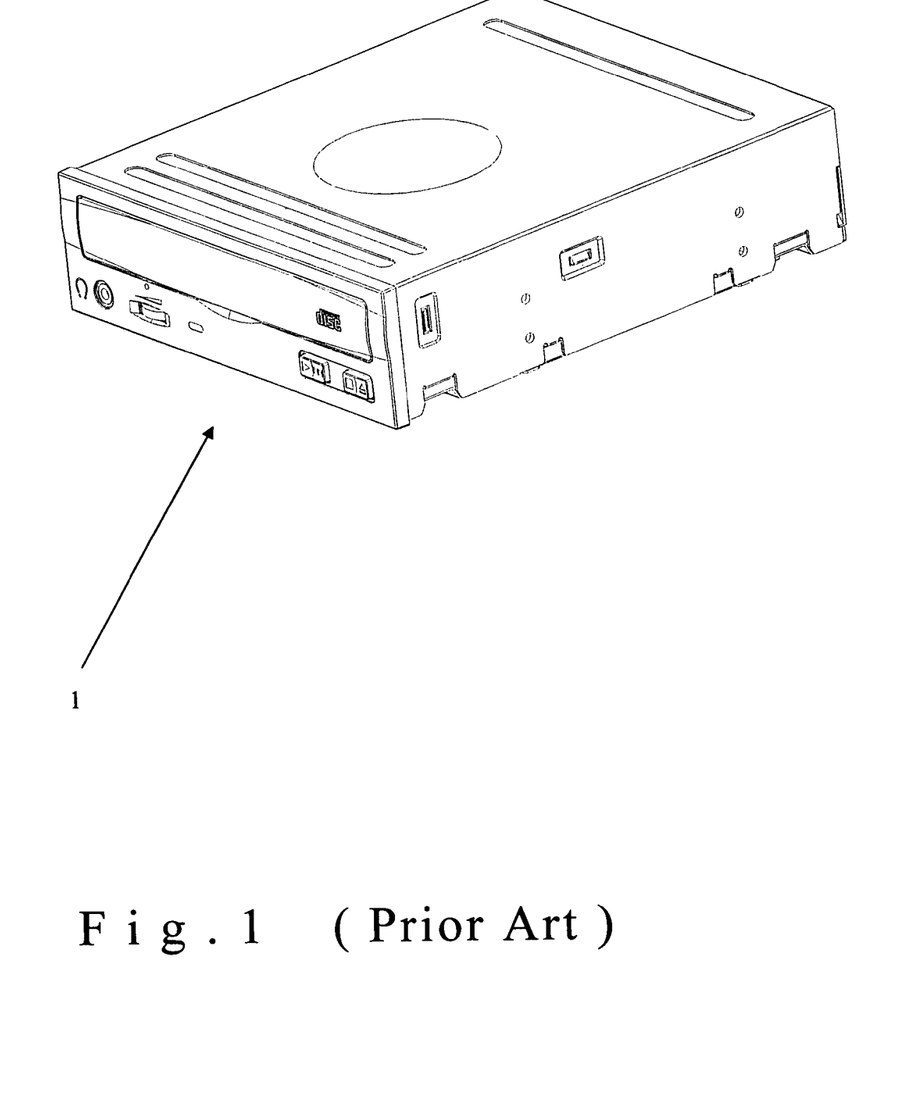
FIG. 1 is a perspective view of a conventional optical disk drive.
Figure 2:
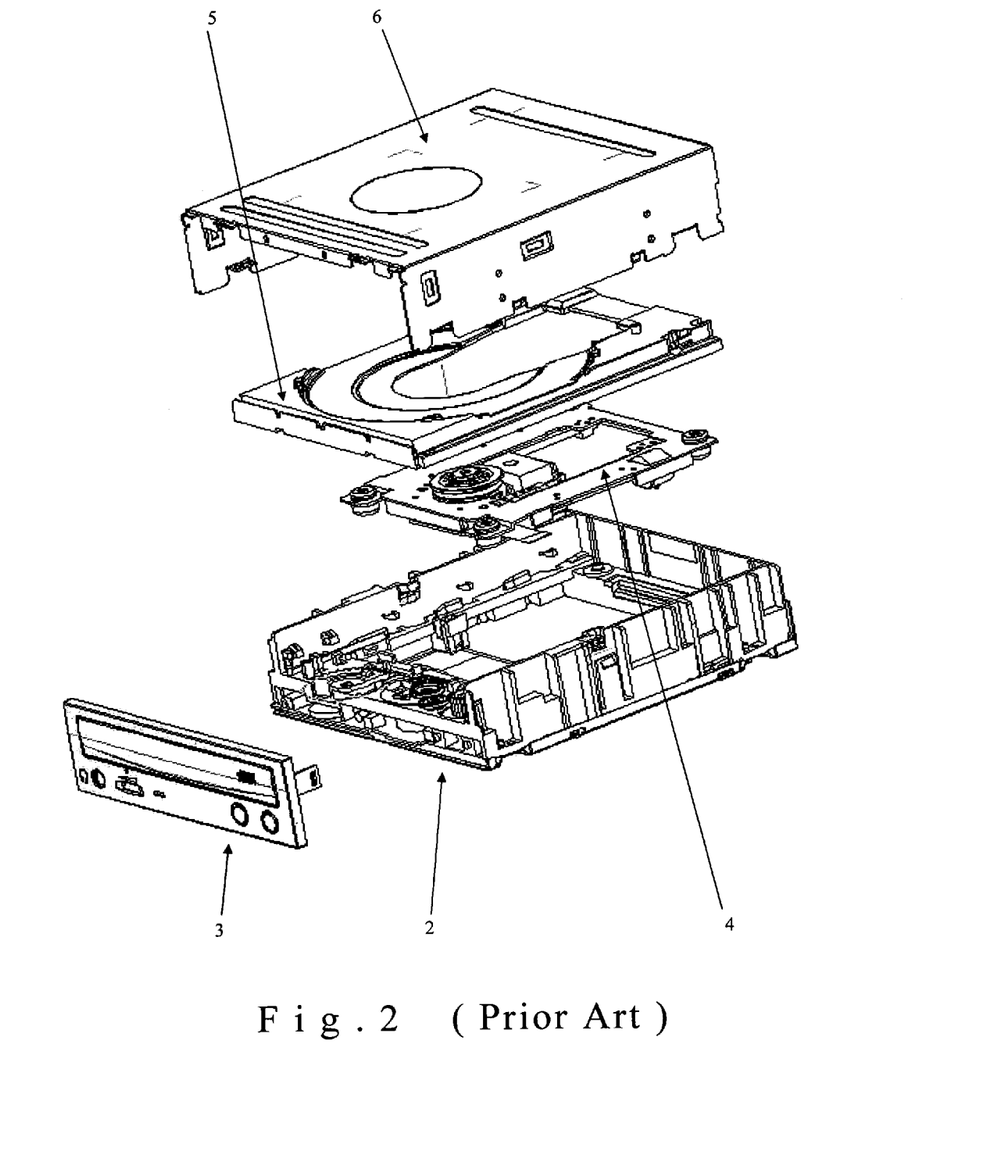
FIG. 2 is an exploded view of the conventional optical disk drive.

Referring to FIGS. 1 and 2, perspective and exploded views of a conventional optical disk drive are shown to include a lower half casing 2, an upper half casing 6 coupled to the lower half casing 2 to form a casing 1, a chassis 4 disposed within the casing 1 for carrying a pick-up head thereon, a front panel 3 fixed to and covering the front open end of the casing 1, and a disk tray 5 disposed within the casing 1 above the chassis 4.

Figure 3:
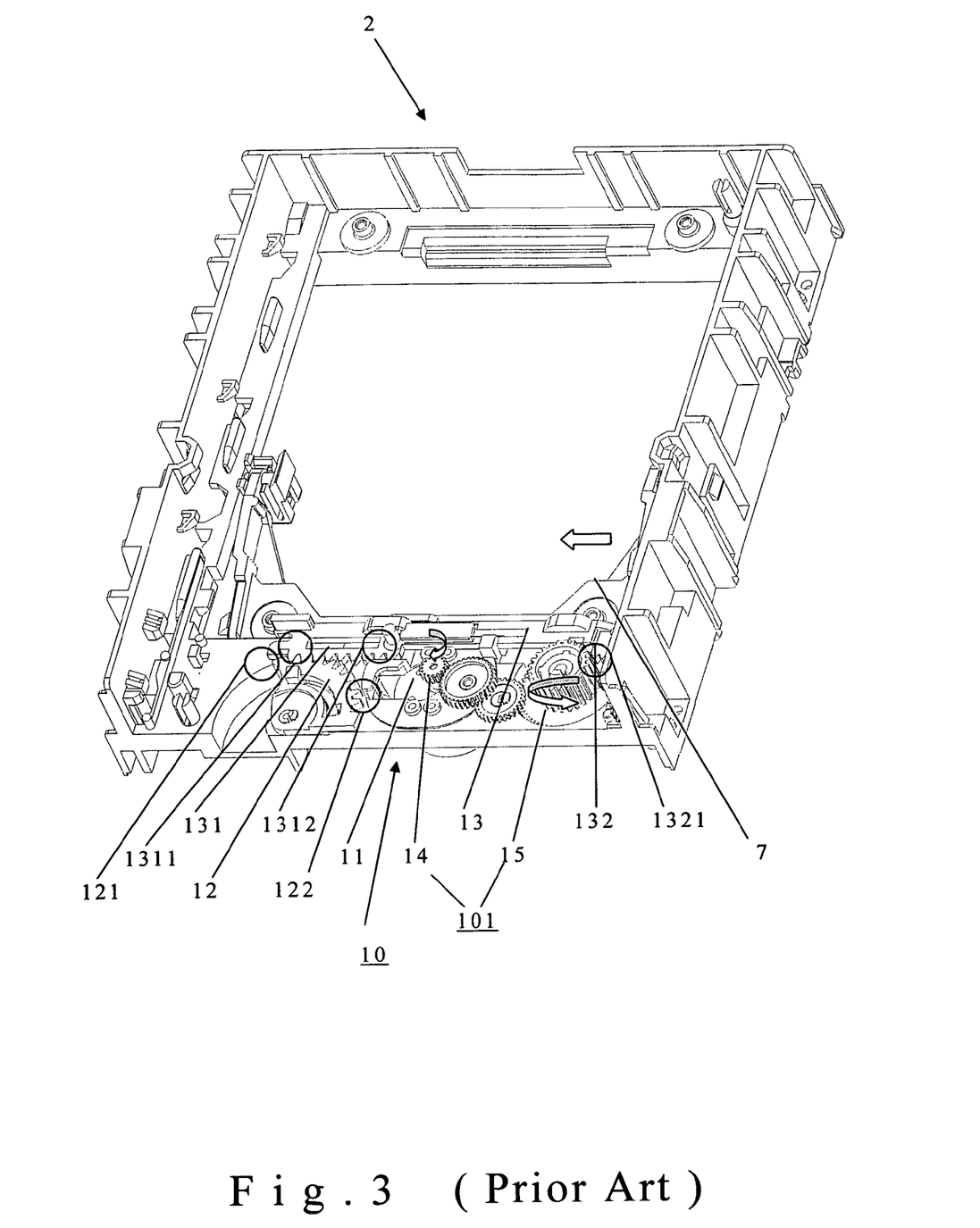
FIG. 3 is a top perspective view of a lower half casing in the conventional optical disk drive, illustrating the driven plate is at the right side of the lower half casing.
Figure 4:
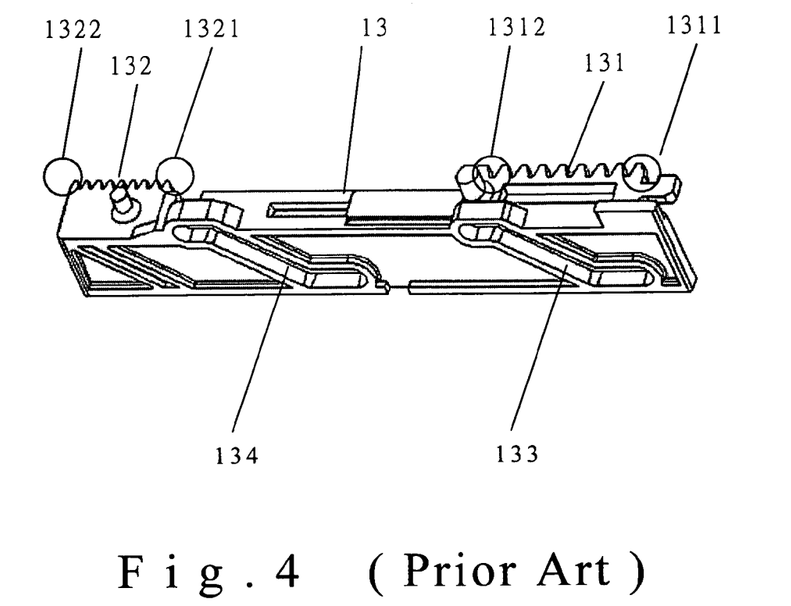
FIG. 4 shows a perspective view of the driven plate employed in the conventional optical disk drive of FIG. 3.
Figure 5:
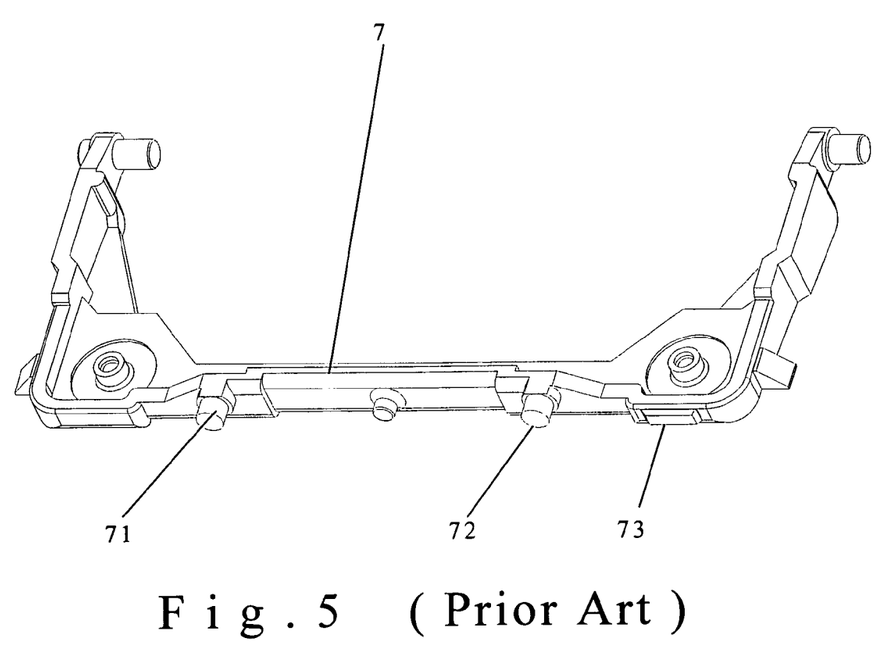
FIG. 5 shows a top perspective view of a lifting frame employed in the conventional optical disk drive of FIG. 3.
Figure 6:
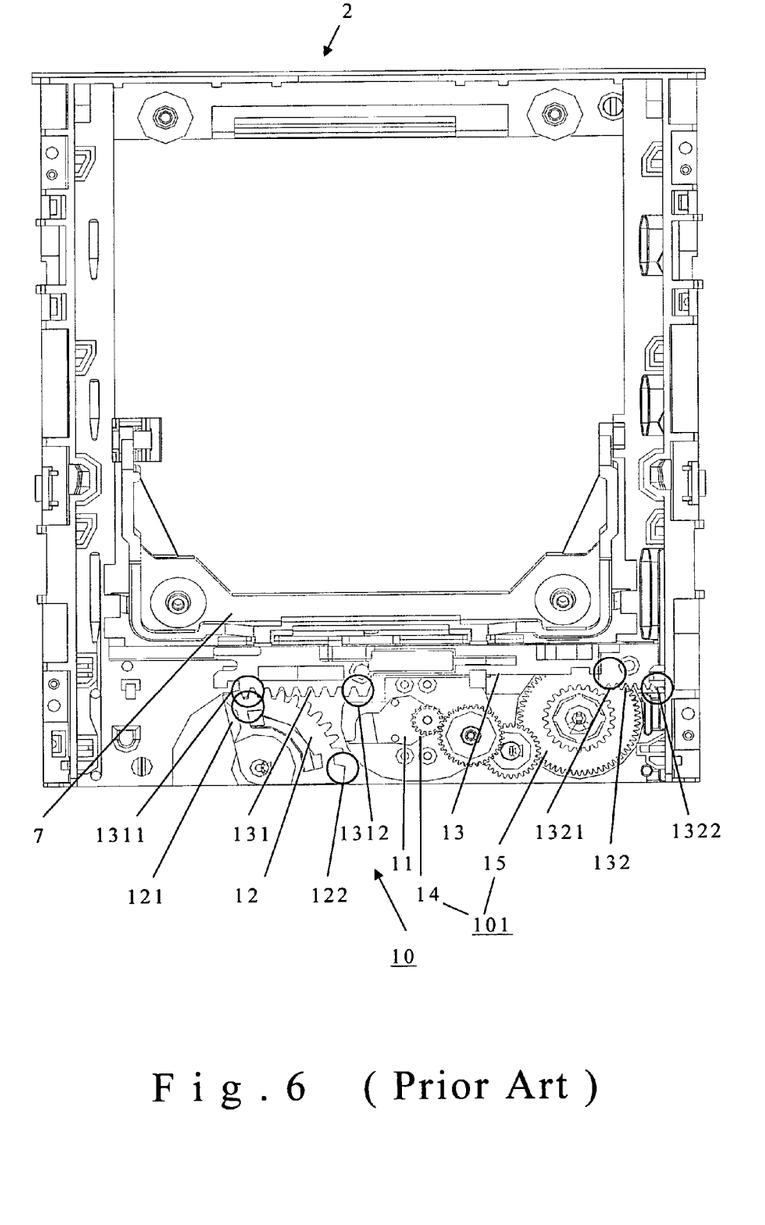
FIG. 6 is a top planar view of the lower half casing in the conventional optical disk drive, illustrating the driven plate is at the right side of the lower half casing.
Figure 8:
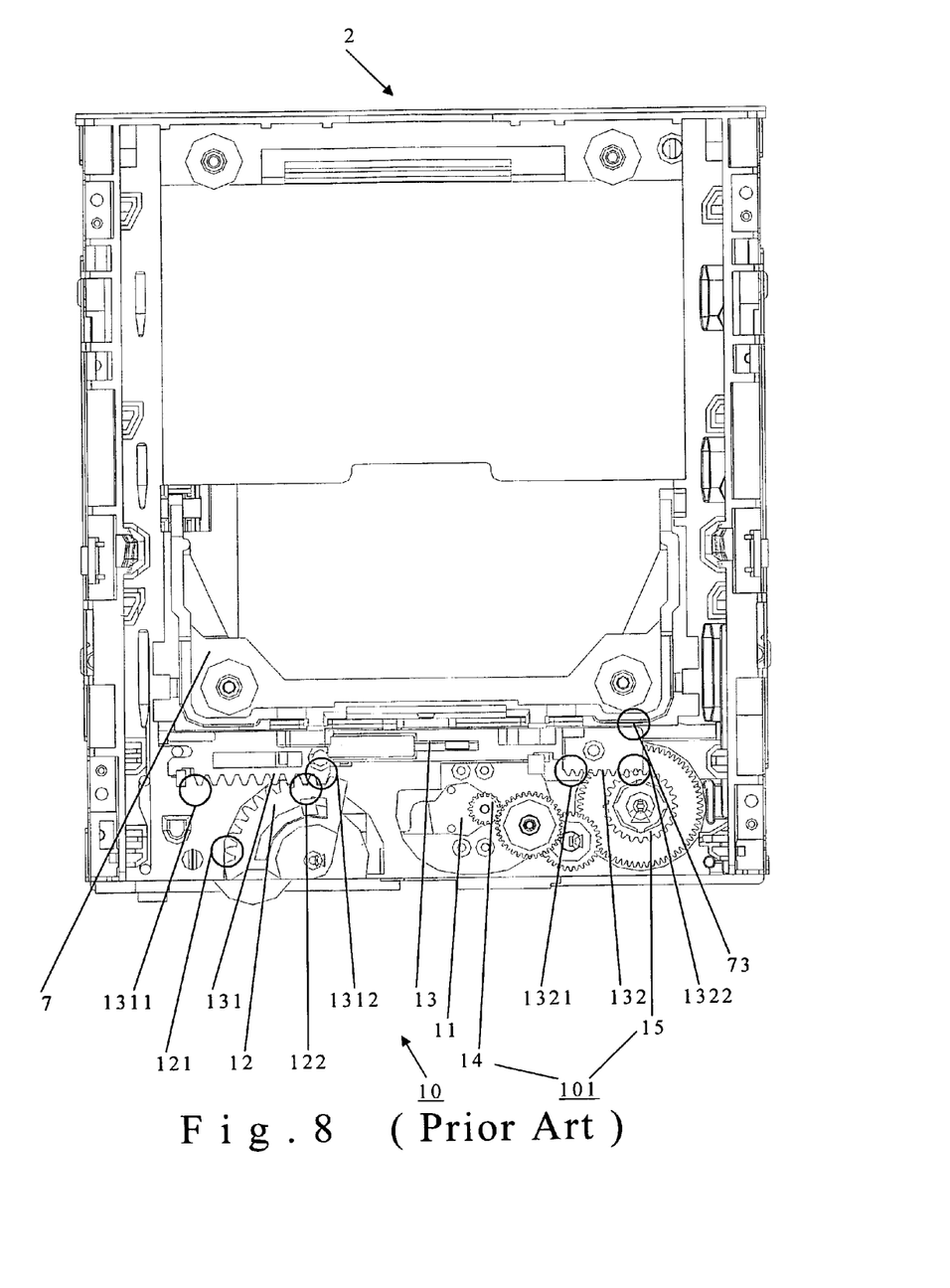
FIG. 8 is a top planar view of the lower half casing in the conventional optical disk drive, illustrating the driven plate is at the left side of the lower half casing.
Figure 9:
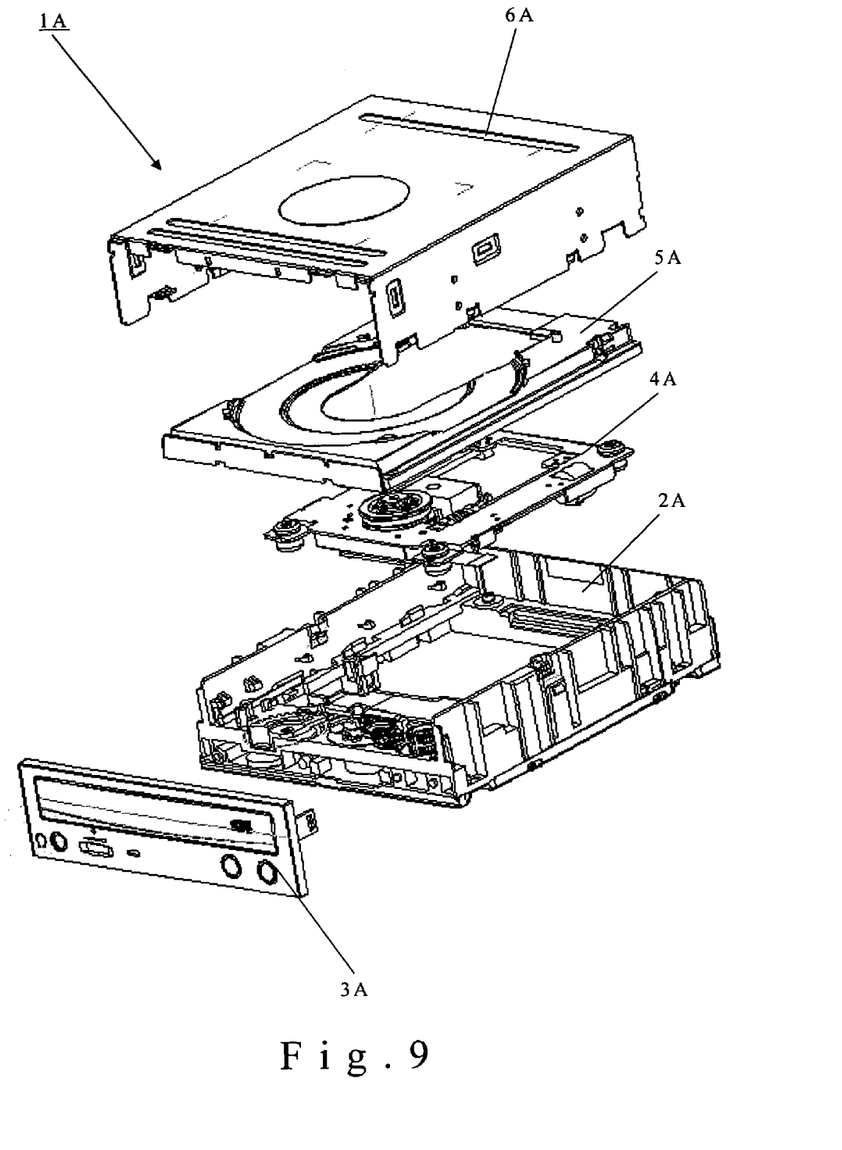
FIG. 9 is an exploded view of an optical disk drive according to the present invention.

Referring to FIGS. 3, 4 and 5, top and perspective views of the lower half casing 2 are shown to include a gear transmission system 10 for driving the disk tray 5 (see FIG. 2) between an extended position, in which, the disk tray 5 extends outwardly from the casing 1 via an entrance-and-exit slot formed through the front panel 3, and a retracted position, in which, the disk tray 5 retracts inwardly into the casing 1 via the entrance-and-exit slot. The gear transmission system 10 includes a first gear 12, a gear transmission unit 101, a driven plate 13, and a lifting frame 7. The first gear 12 is disposed within the lower half casing 2. The gear transmission unit 101 includes a driving motor 11, a second gear 14 fixed co-axially on an output shaft of the driving motor 11, and a third gear 15 coupled to the second gear 14 via a plurality of transmission gears in such a manner that rotation of the second and third gears 14, 15 results in movement of the disk tray 5 between the extended and retracted positions. The driven plate 13 is disposed within the lower half casing 2 and extends in a transverse direction relative to a longitudinal axis of the lower half casing 2. The driven plate 13 is movable along the transverse direction to left and right sides of the lower half casing 2 (see FIGS. 8 and 6). The driven plate 13 has a first serrated portion 131 meshed with the first gear 12, and a second serrated portion 132 disposed adjacent to and facing the third gear 15. The driven plate 13 further has first and second guiding slots 133, 134, each of which is defined by a slot-confining wall. The lifting frame 7 is disposed within the lower half casing 2 at one side of the driven plate 13, and has first and second couplers 71, 72 slidably and respectively engaging with the slot-confining walls of the first and second guiding slots 133, 134 in the driven plate 13, and a protrusion 73. The lifting frame 7 is operably associated with the driven plate 13 in such a manner that movement of the driven plate 13 to the left and right sides of the lower half casing 2 results in movement of the lifting frame 7 to the upper and lower positions. The second serrated portion 132 of the driven plate 13 starts to engage with the third gear 15 during inletting of the disk tray 5 towards the retracted position.

Figure 7:
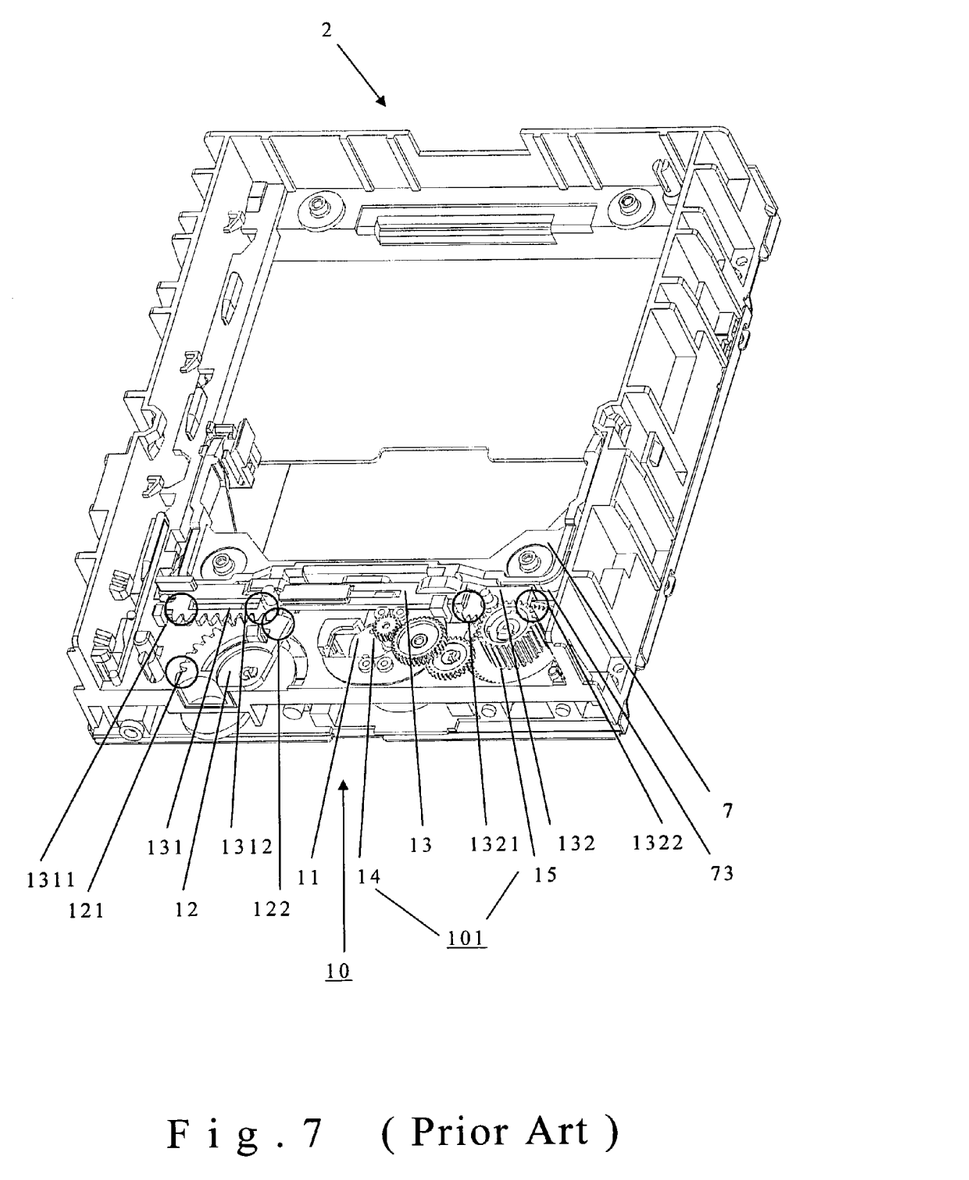
FIG. 7 is a top perspective view of the lower half casing in the conventional optical disk drive, illustrating the driven plate is at the left side of the lower half casing.

When the disk tray 5 is at the extended position (not shown), the driven plate 13 is moved to the right side of the lower half casing 2, the first end 1311 of the first serrated portion 131 is meshed with the first end 121 of the first gear 12, the first end 1321 of the second serrated portion 132 is not engaged with the third gear 15 (see FIGS. 3 and 6) while the lifting frame 7 is in the lower position and the protrusion 73 of the lifting frame 7 does not abut against the driven plate 13. In the same manner, when the disk tray 5 is at the retracted position (not shown), the driven plate 13 is moved to the left side of the lower half casing 2, the second end 1312 of the first serrated portion 131 is meshed with the second end 122 of the first gear 12, the second end 1322 of the second serrated portion 132 is engaged with the third gear 15 while the lifting frame 7 is in the upper position and the protrusion 73 of the lifting arm 7 abuts against the driven plate 13 opposite to the second serrated portion 132 (see FIGS. 7 and 8).

In the aforesaid conventional disk drive, the second serrated portion 132 of the driven plate 13 is not constantly meshed with the third gear 15. The second serrated portion 132 is started to engage with the third gear 15 in the midway of the inletting process of the disk tray 5 so that the engagement between the first end 1321 and the third gear 15 could be improper. Thus, jamming of the second serrated portion 132 with respect to the third gear 15 may occur during the meshing operation. Moreover, after completing the inletting process of the disk tray 5, the second end 1322 of the second serrated portion 132 is engaged with the third gear 15, the third gear 15 would apply a force on the second end 1322 which may cause a break in the tooth of the second end 1322 due to abutment of the protrusion 73 against the driven plate 13 opposite to the second serrated portion 132.

SUMMARY OF THE INVENTION

The object of the present invention is to provide a gear transmission system for an optical disk drive. The gear transmission system of the optical disk drive includes a lifting frame of specific structure that is capable of overcoming the disadvantage generally encountered during use of the conventional disk drive.

In one aspect of the present invention, a disk drive is provided to include: a casing defining a longitudinal axis and a gear transmission system. The gear transmission system includes: a first gear disposed within the casing, a gear transmission unit including a second gear and a third gear, a driven plate disposed within the casing to extend in a transverse direction relative to the longitudinal axis of the casing, and movable along the transverse direction to left and right sides of the casing, the driven plate having a first serrated portion meshed with the first gear, and a second serrated portion disposed adjacent to and facing the third gear, the driven plate further having first and second guiding slots, and a lifting frame disposed within the casing at one side of the driven plate, and having first and second couplers slidably and respectively engaging with the first and second slots in the driven plate, and a resilient pushing arm extending in a direction transverse to the longitudinal axis. The rotation of the third gear results in movement of the driven plate between right and left sides of the casing. The lifting frame is operably associated with the driven plate in such a manner that the movement of the driven plate between the right and left sides of the casing results in the movement of the lifting frame between a lower position and an upper position alternately.

The resilient pushing arm of the lifting frame abuts against the driven plate opposite to the second serrated portion when the lifting frame is in the upper position in such a manner to provide resilience between the driven plate and the third gear so as to prevent jamming therebetween when the second serrated portion is engaged with the third gear.

In another aspect of the present invention, a disk drive is provided to include: a lower half casing defining a longitudinal axis, a disk tray disposed within the lower half casing and movable between an extended position, in which, the disk tray extends outwardly from the lower half casing, and a retracted position, in which, the disk tray retracts inwardly into the lower half casing; and a gear transmission system. The gear transmission system includes: a first gear disposed within said lower half casing, a gear transmission unit including a second gear and a third gear, rotation of the third gear resulting in movement of the disk tray between the extended and retracted positions, a driven plate disposed within the lower half casing to extend in a transverse direction relative to the longitudinal axis of the lower half casing, and movable along the transverse direction to left and right sides of the lower half casing, the driven plate having a first serrated portion meshed with the first gear, and a second serrated portion disposed adjacent to and facing the third gear, the driven plate further having first and second guiding, and a lifting frame disposed within the lower half casing and having first and second couplers slidably and respectively engaging with the first and second slots in the driven plate, and a resilient pushing arm extending in a direction transverse to the longitudinal axis. The rotation of the third gear results in movement of the driven plate between right and left sides of the lower half casing. The lifting frame is operably associated with the driven plate in such a manner that the movement of the driven plate between the right and left sides of the lower half casing results in the movement of the lifting frame between a lower position and an upper position alternately. The resilient pushing arm of the lifting frame abuts against the driven plate opposite to the second serrated portion in such a manner to provide resilience between the driven plate and the third gear so as to prevent jamming therebetween when the second serrated portion is engaged with the third gear.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Referring to FIGS. 9 to 12, an optical disk drive of the present invention is shown to include a casing 1A formed by coupling upper and lower casing halves 6A, 2A, a chassis 4A disposed within the casing 1A for carrying a pick-up head thereon, a front panel 3A fixed to and covering the front open end of the casing 1A, and a disk tray 5A disposed within the casing 1A above the chassis 4A.

As illustrated, a gear transmission system 10A is mounted in the lower half casing 2A for driving the disk tray 5A to move between an extended position (not shown), in which, the disk tray 5A extends outwardly from the casing 1A via an entrance-and-exit slot formed through the front panel 3A, and a retracted position, in which, the disk tray 5A retracts inwardly into the casing 1A via the entrance-and-exit slot in the front panel 3A. The gear transmission system 10A includes a sector-shaped first gear 12A, a gear transmission unit 101A and a driven plate 13A (see FIG. 11), and a lifting frame 7A (see FIG. 12). The sector-shaped first gear 12A is disposed within the lower half casing 2A. The gear transmission unit 101A includes a driving motor 11A, an annular second gear 14A fixed co-axially on an output shaft of the driving motor 11A, and an annular third gear 15A coupled to the second gear 14A via a plurality of transmission gears in such a manner that rotation of the second gear 14A results in the rotation of the third gear 15A. The third gear 15A is meshed with a rack of the disk tray 5A so that the rotation of the third gear 15A results in the movement of the disk tray 5A between the extended and retracted positions (not shown).

The driven plate 13A is disposed within the lower half casing 2A and extends in a transverse direction relative to a longitudinal axis of the lower half casing 2A. The driven plate 13A has a first serrated portion 13A1 meshed with the first gear 12A, and a second serrated portion 13A2 disposed adjacent to and facing the third gear 15A. The driven plate 13A further has a first guiding slot 13A3 and a second guiding slots 13A4, each of which is generally Z-shaped and each of which is defined by a slot-confining wall. The lifting frame 7A, which is pivoted on the lower half casing 2A, has first and second couplers 7A1, 7A2 slidably and respectively engaging the slot-confining walls of the first and second guiding slots 13A3, 13A4 in the driven plate 13A, and a resilient pushing arm 7A3. The pushing arm 7A3 is fabricated by forming a slit at a lateral side of the lifting frame 7A so as to provide resilience thereto. The pushing arm 7A3 extends in a direction transverse to the longitudinal axis of the lower half casing 2A. The lifting arm 7A is operably associated with the driven plate 13A in such a manner that the, movement of the driven plate 13A between the right and left sides of the lower half casing 2A results in the movement of the lifting frame 7A between the lower and upper positions. Since the lifting frame 7A is co-movable with the driven plate 13A, movement of the driven plate 13A from the right side of the lower half casing 2A to the left side of the lower half casing 2A results in lifting of the frame 7A to the upper position (reading position) when the disk tray 5A is fully retracted into the retracted position. At the upper position (see FIG. 14), the resilient pushing arm 7A3 of the lifting frame 7A abuts against the driven plate 13A opposite to the second serrated portion 13A2 so as to provide resilience between the driven plate 13A and the third gear 15A so as to prevent jamming therebetween when the second serrated portion 13A2 is engaged with the third gear 15A.

In the disk drive of the present invention, rotation of the second gear 14A in the clockwise and anti-clockwise directions alternately results in movement of the driven plate 13A to the left and right sides of the lower half casing 2A, which, in turn, results in the movement of the lifting frame 7A between the lower and upper positions, alternately.

Figure 10:
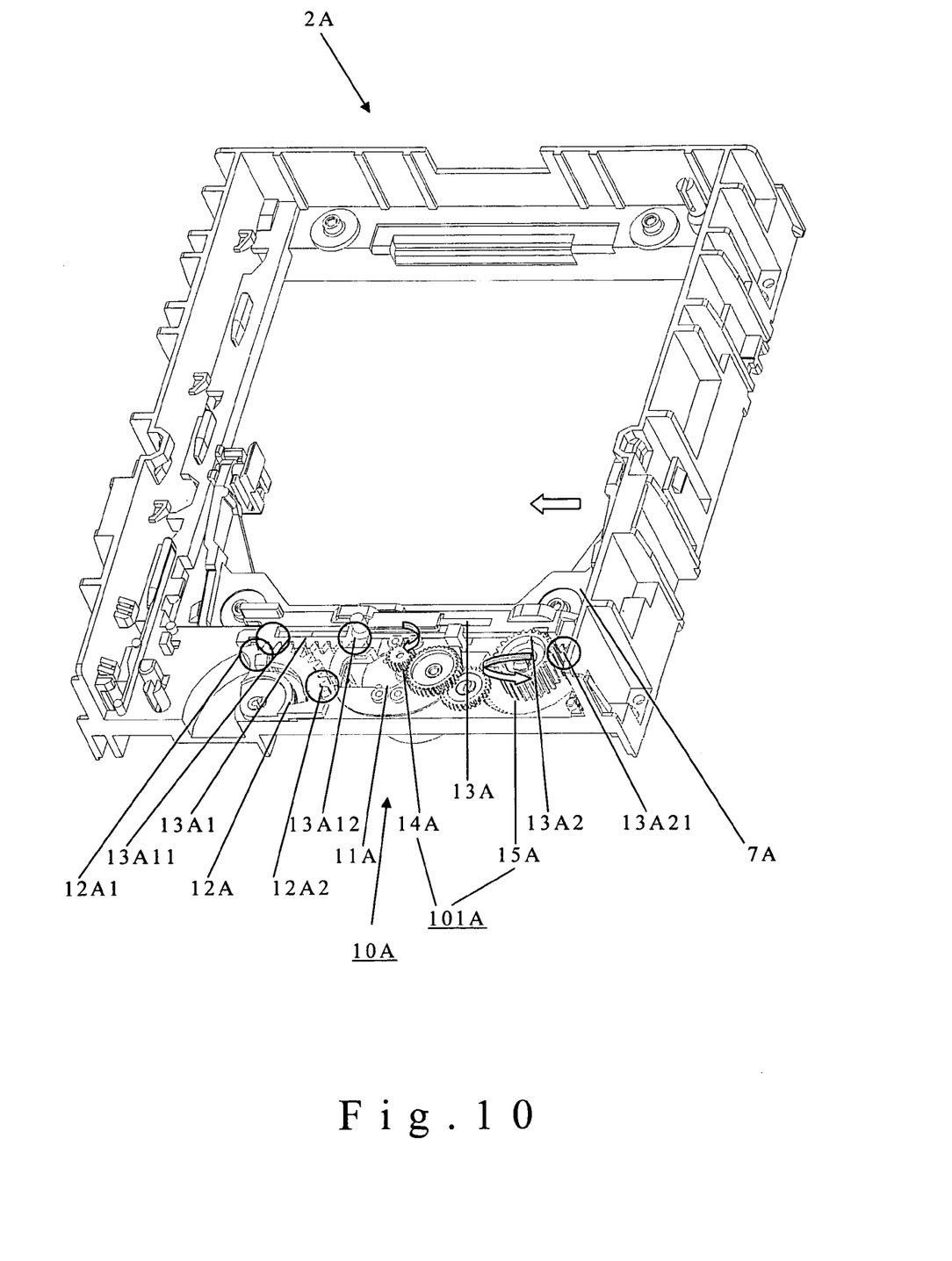
FIG. 10 is a top perspective view of a lower half casing in the optical disk drive of the present invention, illustrating the driven plate is at the right side of the lower half casing.
Figure 11:
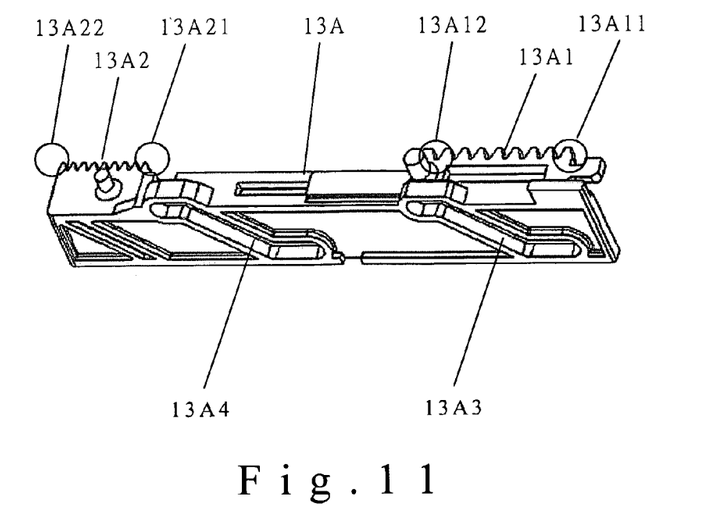
FIG. 11 shows a top perspective view of the driven plate employed in the optical disk drive of the present invention.
Figure 12:
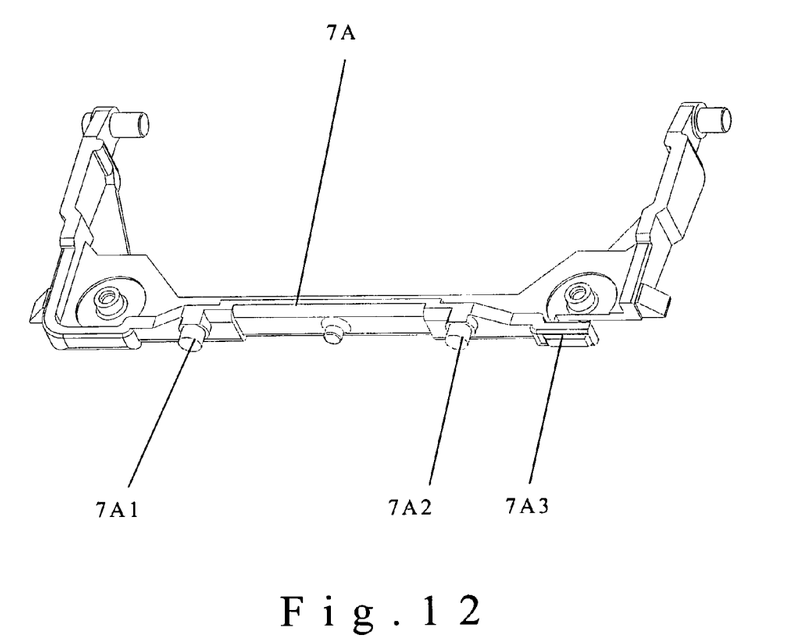
FIG. 12 is a top perspective view of the lifting frame employed in the optical disk drive of the present invention.
Figure 13:
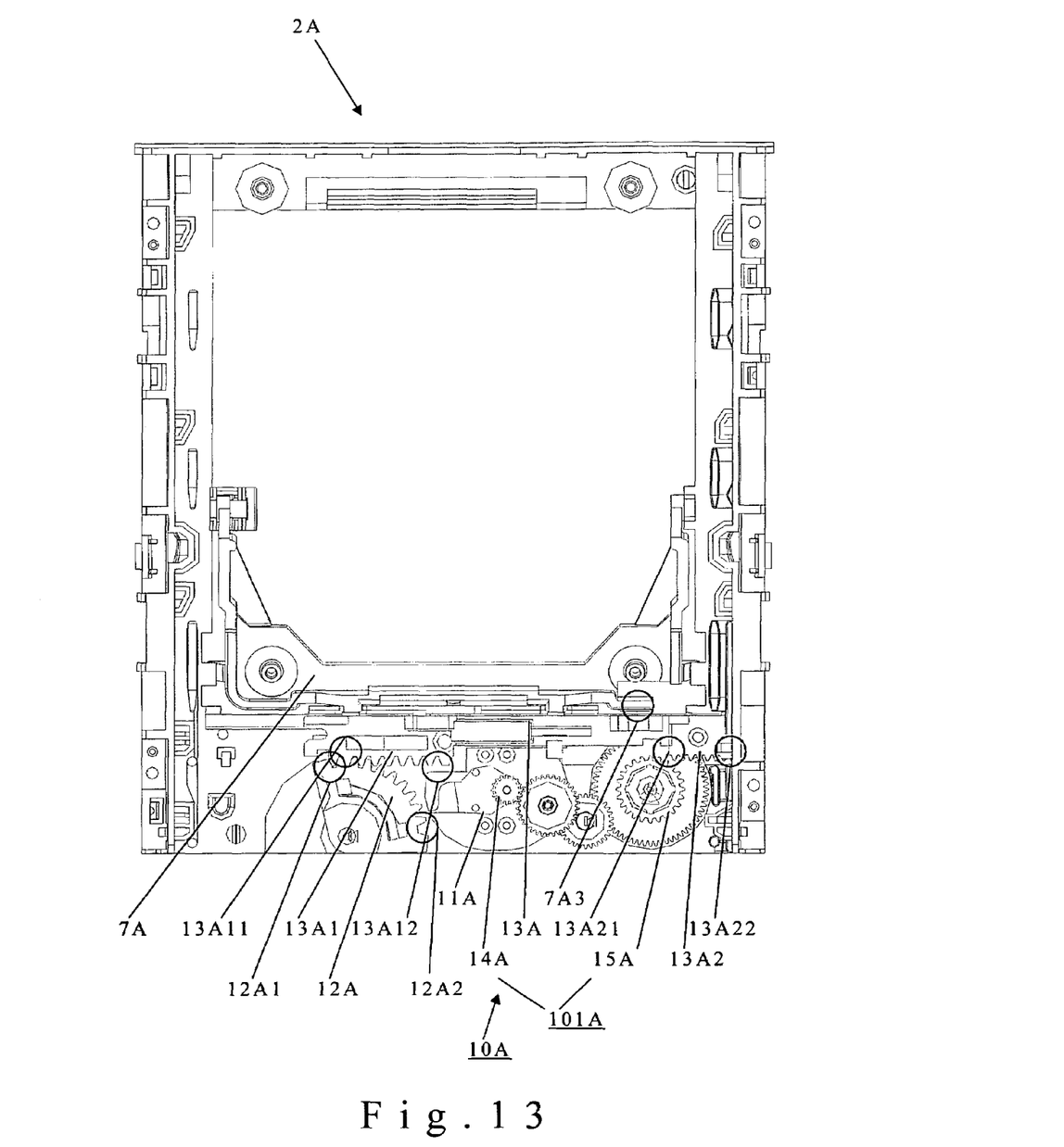
FIG. 13 is a top planar view of the lower half casing of the present invention, illustrating the driven plate is at the right side of the lower half casing.
Figure 14:
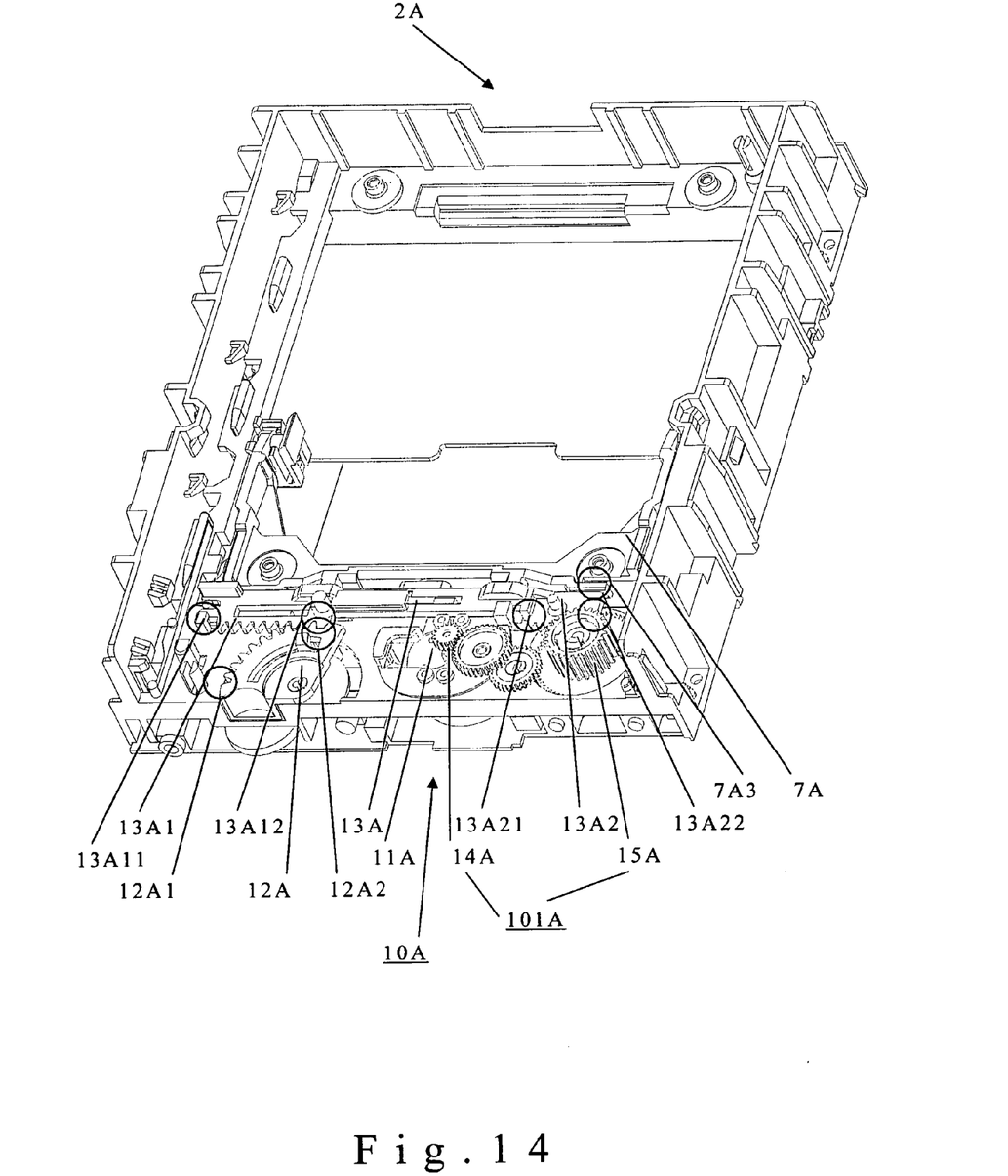
FIG. 14 is a top perspective view of the lower half casing of the present invention, illustrating the driven plate is at the left side of the lower half casing.
Figure 15:
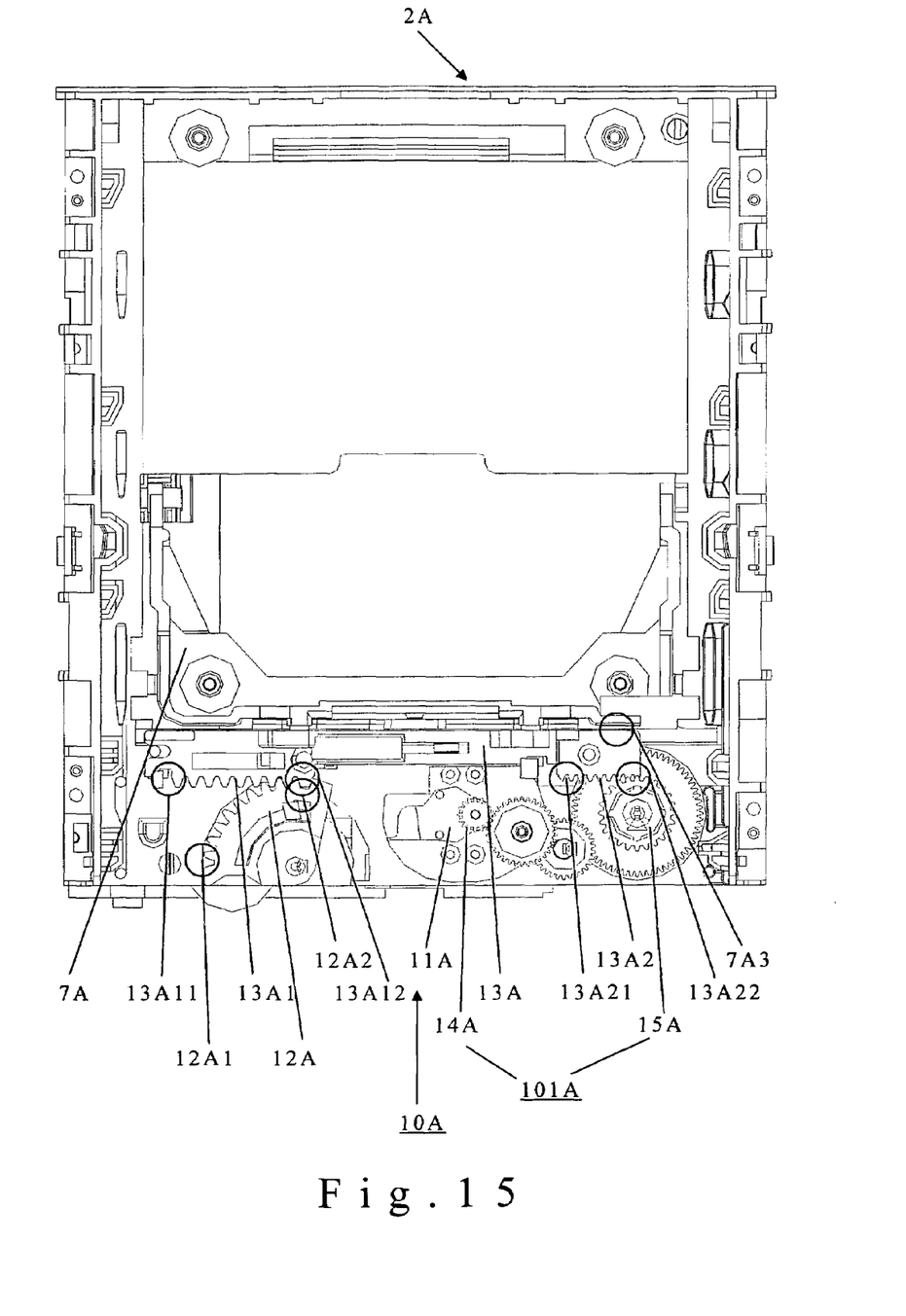
FIG. 15 is a top planar view of the lower half casing of the present invention, illustrating the driven plate is at the left side of the lower half casing.

When the driven plate 13A is moved to the right and left sides of the lower half casing 2A, first and second ends 13A11, 13A12 of the first serrated portion 13A1 respectively meshed with first and second ends 12A1, 12A2 of the first gear 12A (see FIGS. 10 and 14). Note that the second serrated portion 13A2 is not constantly meshed with the third gear 15A (see FIG. 13). The second serrated portion 13A2 is started to engage with the third gear 15A in the midway of the inletting process of the disk tray 5A. The disc tray 5A would push the driven plate 13A to engage with the third gear 15A in the midway of the inletting process of the disk tray 5A, and the third gear 15A starts to move the driven plate 13A from right side to left side of the lower half casing 2A (see FIGS. 14 and 15).

During the initial stage of the engagement and disengagement of the first end 13A21 of the second serrated portion 13A2 with the third gear 15A, jamming action between the second serrated portion 13A2 and the third gear 15A can be avoided by virtue of the resilience provided by the resilient pushing arm 7A3 of the lifting frame 7A. The resilient pushing arm 7A3 of the lifting frame 7A can also absorb the force applied by the third gear 15A onto the second end 13A22 of the second serrated portion 13A2 to avoid the break of tooth of the second end 13A22.

Since the structure of the other parts of the optical disk drive is not the relevant feature of the present invention, a detailed description thereof is omitted herein for the sake of brevity.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A disk drive comprising:
a casing defining a longitudinal axis; and
a gear transmission system including
a first gear disposed within said casing,
a gear transmission unit including a second gear and a third gear,
a driven plate disposed within said casing to extend in a transverse direction relative to said longitudinal axis of said casing, and movable along said transverse direction to a left and a right side of said casing, said driven plate having a first serrated portion meshed with said first gear, and a second serrated portion disposed adjacent to and facing said third gear, said driven plate further having first and second guiding slots, and
a lifting frame disposed within said casing, and having first and second couplers slidably and respectively engaging with said first and second slots in said driven plate, and a resilient pushing arm extending in a direction transverse to said longitudinal axis and forming a slit therebetween;
wherein, the rotation of said third gear results in movement of said driven plate between said right and left sides of said casing,
wherein, said lifting frame is operably associated with said driven plate in such a manner that the movement of said driven plate between said right and left sides of said casing results in the movement of said lifting frame between a lower position and an upper position alternately,
wherein said resilient pushing arm abuts against said driven plate opposite to said second serrated portion when said lifting frame is in said upper position for absorbing the force applied by said third gear onto said second serrated portion.

2. The disk drive according to claim 1, wherein said first serrated portion of said driven plate has first and second ends, said first gear having first and second ends respectively meshed with said first and second ends of said first serrated portion of said driven plate when said driven plate is moved to said right and left sides of said casing.

3. The disk drive according to claim 1, further comprising a motor and a plurality of transmission gears, said second gear being driven by said motor, said third gear being driven by said second gear via said plurality of transmission gears.

4. The disk drive according to claim 1, wherein each of said first and second guiding slots is defined by a slot-confining wall.

5. A disk drive comprising:
a lower half casing defining a longitudinal axis;
a disk tray disposed within said lower half casing and movable between an extended position, in which, said disk tray extends outwardly from said lower half casing, and a retracted position, in which, said disk tray retracts inwardly into said lower half casing; and
a gear transmission system including
a first gear disposed within said lower half casing,
a gear transmission unit including a second gear and a third gear, rotation of said third gear resulting in movement of said disk tray between said extended and retracted positions,
a driven plate disposed within said lower half casing to extend in a transverse direction relative to said longitudinal axis of said lower half casing, and movable along said transverse direction to a left and a right side of said lower half casing, said driven plate having a first serrated portion meshed with said first gear, and a second serrated portion disposed adjacent to and facing said third gear, said driven plate further having first and second guiding slots, and
a lifting frame disposed within said lower half casing and having first and second couplers slidably and respectively engaging with said first and second slots in said driven plate, and a resilient pushing arm extending in a direction transverse to said longitudinal axis and forming a slit therebetween;

wherein the rotation of said third gear results in movement of said driven plate between said right and left sides of said lower half casing, wherein said lifting frame is operably associated with said disk tray in such a manner that the movement of said driven plate between said right and left sides of said lower half casing results in the movement of said lifting frame between a lower position and an upper position alternately, wherein said resilient pushing arm of said lifting frame abuts against said driven plate opposite to said second serrated portion when said lifting frame is in said upper position in such a manner to absorb the force applied by said third gear onto said second serrated portion.

6. The disk drive according to claim 5, wherein said first serrated portion of said driven plate has first and second ends, said first gear having first and second ends respectively meshed with said first and second ends of said first serrated portion of said driven plate when driven plate is moved to said right and left sides of said lower half casing.

7. The disk drive according to claim 5, further comprising a motor and a plurality of transmission gears, said second gear being driven by said motor, said third gear being driven by said second gear via said plurality of transmission gears.

8. The disk drive according to claim 5, wherein said second serrated portion of said driven plate starts to engage with said third gear during inletting said disk tray to said retracted position, said second serrated portion of said driven plate disengaging from said third gear during extending said disk tray to said extended position.

9. The disk drive according to claim 5, wherein each of said first and second guiding slots being defined by a slot-confining wall.

10. The disk drive according to claim 9, wherein said slot-confining wall of each of said first and second slots in said driven plate has two opposite ends confining a respective one of said first and second couplers of said lifting frame, thereby defining a moving range of said disk tray with respect to said lower half casing.

* * * * *